United States Patent

Miyazaki et al.

[11] Patent Number: 6,064,444
[45] Date of Patent: May 16, 2000

[54] PICTURE PROCESSING APPARATUS AND PROCESSING METHOD

[75] Inventors: Shinichiro Miyazaki; Akira Shirahama, both of Kanagawa; Takeshi Ono, Saitama; Nobuo Ueki, Chiba, all of Japan

[73] Assignee: Sony Corporation, Tokyo, Japan

[21] Appl. No.: 08/882,153

[22] Filed: Jun. 25, 1997

[30] Foreign Application Priority Data

Jul. 2, 1996 [JP] Japan ..................... 8-191583

[51] Int. Cl.$^7$ ..................................... H04N 7/01
[52] U.S. Cl. ..................... 348/581; 348/445; 348/448; 348/556; 348/913
[58] Field of Search ............................ 348/561, 556, 348/581, 704, 458, 445, 913, 222, 208, 240, 448, 588, 558; 382/300; H04N 7/01

[56] References Cited

U.S. PATENT DOCUMENTS

| | | | |
|---|---|---|---|
| 5,253,064 | 10/1993 | Yamamoto | 348/240 |
| 5,325,182 | 6/1994 | Murata | 348/663 |
| 5,475,426 | 12/1995 | Kinugasa | 348/240 |
| 5,534,934 | 7/1996 | Katsumata | 348/448 |
| 5,563,652 | 10/1996 | Toba | 348/208 |
| 5,572,254 | 11/1996 | Kawahara | 348/222 |
| 5,646,696 | 7/1997 | Sprague | 348/458 |
| 5,739,867 | 4/1998 | Eglit | 345/127 |
| 5,754,243 | 5/1998 | Kurihara | 348/445 |
| 5,847,714 | 12/1998 | Naqvi | 348/561 |
| 5,903,315 | 5/1999 | Itoh | 348/564 |

*Primary Examiner*—John K. Peng
*Assistant Examiner*—Wesner Sajous
*Attorney, Agent, or Firm*—Jay H. Maioli

[57] ABSTRACT

A picture processing apparatus and method for enlarging and reducing a picture wherein when a picture is reduced, horizontally adjacent pixel data is supplied from a delaying device to a horizontally interpolating circuit. With the pixel data, a coefficient p and a 1's complement (1−p) thereof supplied from an interpolation coefficient circuit, an interpolating process in the horizontal direction is performed. In addition, a pixel at the position of p=1 is thinned out. Pixel data that has been interpolated in the horizontal and vertical directions and that has been thinned out is written to a memory. When a picture is enlarged, pixel data that is read from a memory is delayed by two line memories and two adjacent pixels are properly selected by a switch circuit. A vertically interpolating circuit performs an interpolating process in the vertical direction. When pixel data is read from the memory, particular pixel data is read twice depending on a magnification. In the horizontal direction, likewise, an interpolating process is performed in the similar manner and an enlarging process is performed.

12 Claims, 9 Drawing Sheets

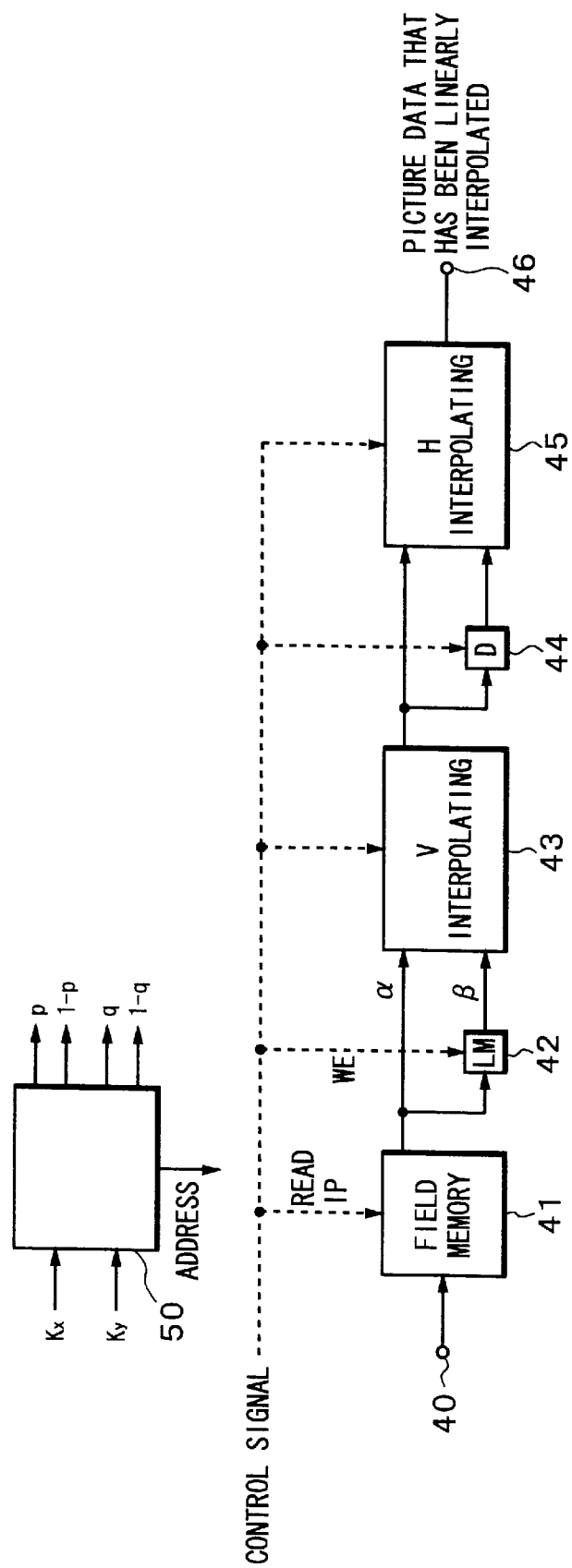

read
IP

α

WE

β

PICTURE PROCESSING APPARATUS AND PROCESSING METHOD

BACKGROUND OF THE INVENTION

1. Field of the Invention

The present invention relates to a picture processing apparatus and a processing method thereof for enlarging/reducing a picture with any ratio, the apparatus and method being applicable for a special effect generating unit used in a broadcast station, a television receiver, or a video tape recorder.

2. Description of the Prior Art

As an interpolating method for enlarging/reducing a picture with a desired ratio free of deterioration of the resultant picture, linearly interpolating method is known. In the linearly interpolating method, the position of any point (pixel) of an enlarged/reduced picture (hereinafter referred to as converted picture) corresponding to an original picture that has not been enlarged/reduced (hereinafter referred to as original picture) is obtained. Corresponding to gradation values of four adjacent pixels of the obtained position, the gradation value of the desired position of the converted picture is obtained.

For example, as shown in FIG. 8, it is assumed that an original picture 100 is enlarged with any magnification k (for example, 1.3 times) and thereby a converted picture 101 is formed. First, a point a of the original picture 100 corresponding to a point A of the converted picture 101 is obtained. The coordinates of the point a can be obtained by dividing the coordinate values of the point A by the magnification k. Assuming that the coordinates of the point A are A(5, 3), the coordinates of the point a are obtained as a(5/1.3, 3/1.3)=a(3.8462, 2.3077).

As shown in FIG. 9, the point a is present in an area surrounded by four adjacent points represented by $a_{00}(3, 2)$, $a_{10}(4, 2)$, $a_{01}(3, 3)$, and $a_{11}(4, 3)$. The gradation value of the point a can be obtained by the sum of products of the gradation values (pixel data) of the pixels at these four points and the internally divided ratio of p and q in the area surrounded by the four adjacent points of the point a. In other words, the gradation value of the point a can be obtained by the following formula (1).

$$A=(1-p)(1-q) \cdot a_{00}+p \cdot (1-q) \cdot a_{10}+(1-p)q \cdot a_{01}+pq \cdot a_{11} \quad (1)$$

The gradation value of the point a is equal to the gradation value of the point A on the converted coordinates. Thus, by performing calculations of the formula (1) for all pixels of the converted picture, pixels are interpolated. The internally divided ratio of p and q is equivalent to an interpolation coefficient in the horizontal direction and an interpolation coefficient in the vertical direction, respectively. In this process, a point on the converted coordinates is mapped to a point on the original picture so as to prevent a pixel from being lost.

FIG. 10 shows an example of the structure that accomplishes such a process. Picture data of an original picture is received from an input terminal 110. The received original picture data is supplied to low pass filters 111 and 112 that perform a low pass process in the horizontal direction and a low pass process in the vertical direction, respectively. The resultant data is written to field memories 113a, 113b, 113c, and 113d. The same original picture data is written to the field memories 113a, 113b, 113c, and 113d.

The position of the point a of the original picture corresponding to any pixel A of the converted picture is obtained in a predetermined method. Corresponding to the position of the point a, coordinates $a_{00}$, $a_{10}$, $a_{01}$, and $a_{11}$ of four pixels adjacent to the point a are obtained. Corresponding to these coordinates $a_{00}$, $a_{10}$, $a_{01}$, and $a_{11}$, addresses for which gradation values (pixel data) of pixels corresponding to the coordinates $a_{00}$, $a_{10}$, $a_{01}$, and $a_{11}$ are read from the field memories 113a, 113b, 113c, and 113d are generated, respectively. The generated addresses are supplied to the memories 113a, 113b, 113c, and 113d (not shown).

The gradation values of pixels corresponding to the coordinates $a_{00}$, $a_{10}$, $a_{01}$, and $a_{11}$ are read from the field memories 113a, 113b, 113c, and 113d, respectively. The resultant gradation values are supplied to a vertically/horizontally interpolating circuit 114. The vertically/horizontally interpolating circuit 114 is composed of a plurality of multiplying devices and a plurality of adding devices so as to accomplish the calculation of the formula (1). The vertically/horizontally interpolating circuit 114 calculates the formula (1) corresponding to the gradation values of the pixels of the coordinates $a_{00}$, $a_{10}$, $a_{01}$, and $a_{11}$ so as to interpolate the gradation value of the pixel A of the converted picture. The obtained gradation value is supplied to an output terminal 115.

By performing such an interpolating process for all pixels of the converted picture, a converted picture of which the original picture is enlarged for example 1.3 times can be obtained.

In the conventional method, to obtain the gradation value of the pixel A of the converted picture, gradation values of four points of the original picture are required on real time basis. The coordinate values of the four points are varied corresponding to the size of the converted picture (namely, the reduction/enlargement ratio of the converted picture to the original picture). Thus, the four field memories 113a, 113b, 113c, and 113d to which the same original picture data is written and that is randomly accessed are required. Thus, the cost of the final product becomes high.

Moreover, in the above-described formula (1), since a multiplying process should be performed eight times, eight multiplying devices are required to accomplish the formula (1). These multiplying devices cause the cost of the final product to rise.

To reduce the cost of the final product, conventionally, most adjacent pixel interpolating method has been used. In this method, a pixel most adjacent to the position of a point a of an original picture is used as a pixel A of a converted picture. Since the accuracy of the interpolating process in this method is low, a high picture quality cannot be obtained.

Moreover, as described above, in the structure of the prior art reference, a linear interpolating circuit for reducing/enlarging a picture should be disposed upstream of the field memories.

OBJECTS AND SUMMARY OF THE INVENTION

Therefore, an object of the present invention is to provide a picture processing apparatus and a processing method for enlarging/reducing a picture at any magnification with a high picture quality while decreasing the number of field memories.

A first aspect of the present invention is a picture processing apparatus for enlarging/reducing a picture composed of pixels as digital data with any ratio, comprising a field memory to which pixel data is written for each field, a horizontally interpolating means for performing an interpolating process in the horizontal direction for the pixel data, and a vertically interpolating means for performing an interpolating process in the vertical direction for the pixel data, wherein the interpolating process in the horizontal direction and the interpolating process in the vertical direction are successively performed.

A second aspect of the present invention is a picture processing method for enlarging/reducing a picture composed of pixels as digital data with any ratio, comprising the steps of (a) writing pixel data for each field, (b) performing an interpolating process in the horizontal direction for the pixel data, and (c) performing an interpolating process in the vertical direction for the pixel data, wherein the interpolating process in the horizontal direction and the interpolating process in the vertical direction are successively performed.

A third aspect of the present invention is a picture processing apparatus for linearly interpolating a picture composed of pixels as digital data so as to enlarge/reduce the picture with any ratio, comprising a field memory to or from which pixel data is written or read, and at least one of picture reduction interpolating means disposed upstream of the field memory and picture enlargement interpolating means disposed downstream of the field memory, wherein the picture reduction interpolating means includes a first horizontally interpolating means for performing an interpolating process in the horizontal direction for two horizontally adjacent pixels, and a first vertically interpolating means for performing an interpolating process in the vertical direction for two vertically adjacent pixels, the first vertically interpolating means being connected to the first horizontally interpolating means, and wherein the picture enlargement interpolating means includes a second vertically interpolating means for performing an interpolating process in the vertical direction for two adjacent pixels selected from a plurality of vertically successive pixels, and a second horizontally interpolating means for performing an interpolating process in the horizontal direction for two adjacent pixels selected from a plurality of horizontally successive pixels, the second horizontally interpolating means being connected to the second vertically interpolating means in series.

As described above, according to the present invention, the picture reducing process is performed upstream of the field memories. The picture enlarging process is performed downstream of the field memories. In addition, the interpolating process in the horizontal direction and the interpolating process in the vertical direction are performed in series. Thus, a picture can be enlarged or reduced at any magnification with a reduced number of field memories.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 6 is a block diagram showing an example of the structure of a picture processing apparatus according to a third embodiment of the present invention;

DETAILED DESCRIPTION OF THE PREFERRED EMBODIMENTS

Next, a first embodiment of the present invention will be described. According to the present invention, the formula (1) is transformed to a formula with respect to a interpolation coefficient p in the horizontal direction and a formula with respect to an interpolation coefficient q in the vertical direction. Corresponding to the transformed results, an interpolating process in the horizontal direction and an interpolating process in the vertical direction are independently performed in series. Since a picture enlarging process and a picture reducing process are independently performed, a picture can be enlarged/reduced with a reduced number of field 10 memories.

When the formula (1) is arranged with respect to the interpolation coefficients p and q, the formula (1) is transformed to the following formulas (2) and (3), respectively.

$$A=(1-p)\cdot\{(1-q)\cdot a_{00}+q\cdot a_{01}\}+p\cdot\{(1-q)\cdot a_{10}+q\cdot a_{11}\} \quad (2)$$

$$A=(1-q)\cdot\{(1-p)\cdot a_{00}+p\cdot a_{10}\}+q\cdot\{(1-p)\cdot a_{01}+p\cdot a_{11}\} \quad (3)$$

These formulas (2) and (3) represent that even if the interpolating process in the horizontal direction and the interpolating process in the vertical direction are independently performed, the same gradation value a is obtained as the process result. In other words, in the formula (3), two adjacent points $a_{00}$ and $a_{10}$ on a line n and two adjacent points $a_{01}$ and $a_{11}$ on a line (n+1) are horizontally interpolated with respect to the interpolation coefficient p. In other words, a calculation of "$(1-p)\times a_{00}+p\times a_{10}$" and a calculation of "$(1-p)\times a_{01}+p\times a_{11}$" are performed. The calculated results are vertically interpolated with respect to the interpolation coefficient q. Thus, the gradation value a of the point a of the original picture corresponding to the point A of the converted picture is obtained. In addition, the formula (2) represents that when the interpolating process in the vertical direction is performed and then the interpolating process in the horizontal direction is performed, the gradation value of the point a of the original picture can be obtained.

Thus, since the interpolating process in the horizontal direction and the interpolating process in the vertical direction are separated and the calculated result does not depend on the order thereof, the gradation value of the pixel A of the converted picture can be obtained with gradation values of two adjacent points of the original picture instead of gradation values of four adjacent points. Thus, the interpolating process in the vertical direction and the interpolating process in the horizontal direction can be performed with two field memories instead of four field memories.

Figure 1:
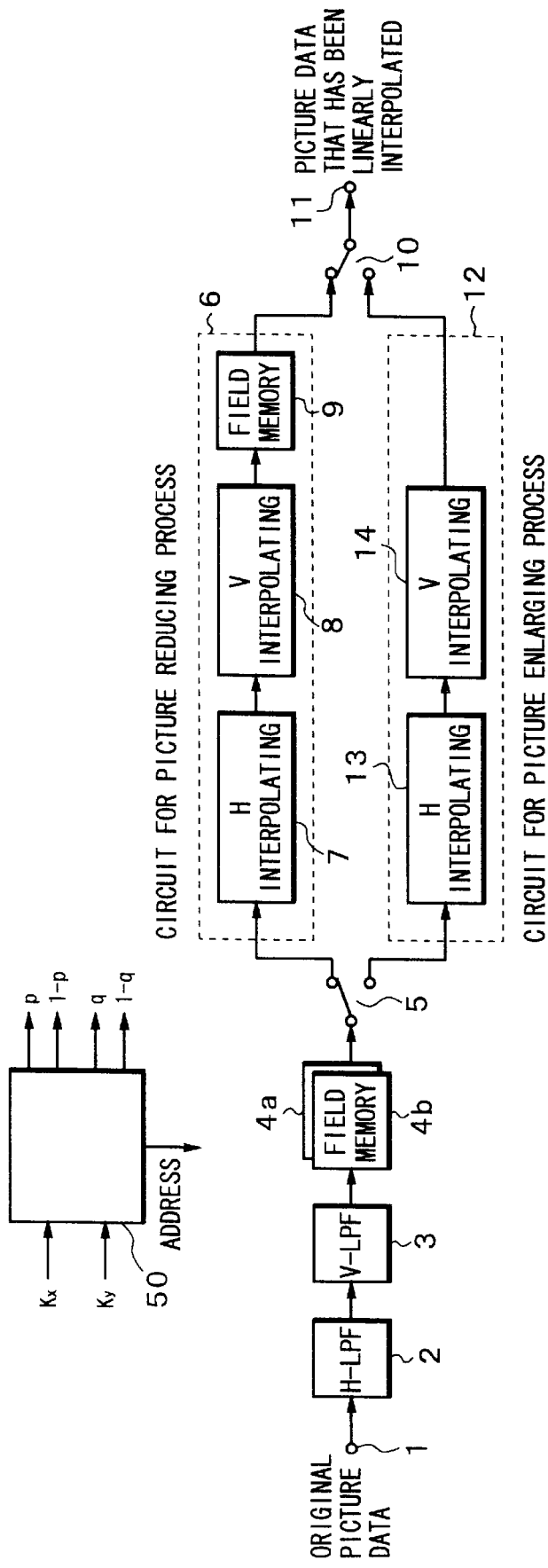
FIG. 1 is a block diagram showing an example of the structure of a picture processing apparatus according to a first embodiment of the present invention.

FIG. 1 shows an example of the structure of a picture processing apparatus that performs interpolating processes in the above-described manner according to the first embodiment of the present invention. To prevent a folding distortion in the picture reducing process, original picture data received from an input terminal is supplied to field memories 4a and 4b through a low pass filter 2 that performs a low pass process in the horizontal direction and a low pass filter 3 that performs a low pass process in the vertical direction, respectively. The same original picture data is written to the field memories 4a and 4b.

A horizontal magnification $k_x$ and a vertical magnification $k_y$ for enlarging/reducing an original picture are designated in a predetermined method beforehand. When the picture processing apparatus is built in a television receiver, the horizontal magnification $k_x$ and the vertical magnification $k_y$ are designated on the front panel of the television receiver or with an inputting device such as arrow keys of a remote control commander.

Figure 2:
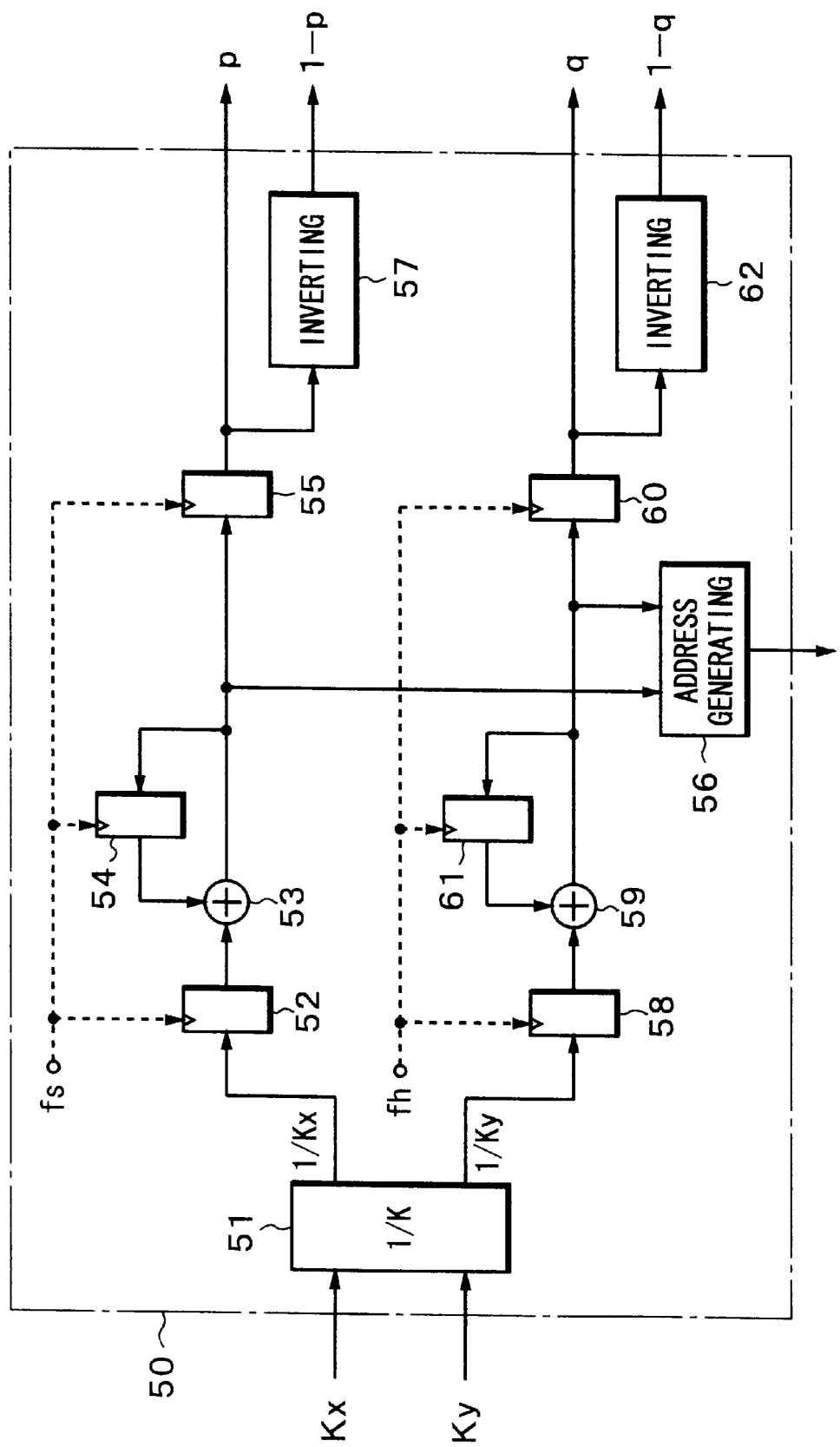
FIG. 2 is a block diagram showing an example of the structure of an interpolation coefficient generator.

An interpolation coefficient generator 50 generates interpolation coefficients p and q and 1's complements (1−p) and (1−q) thereof. In addition, the interpolation coefficient generator 50 generates addresses for which pixel data is read from the field memories 4a and 4b. FIG. 2 shows an example of the structure of the interpolation coefficient generator 50. The horizontal magnification $k_x$ and the vertical magnification $k_y$ are supplied to a dividing device 51. The dividing device 51 calculates reciprocals $1/k_x$ and $1/k_y$ of the horizontal magnification $k_x$ and the vertical magnification $k_y$, respectively. The calculated reciprocals $1/k_x$ and $1/k_y$ are supplied to respective latch input terminals of latch circuits 52 and 58, respectively. To simplify the description, in this example, when a picture is enlarged/reduced, the horizontal magnification $k_x$ is the same as the vertical magnification $k_y$ is kept constant. In other words, $k=k_x=k_y$.

The reciprocal $1/k_x$ of the horizontal magnification is supplied to the latch circuit 52. The latch circuit 52 latches the received signal and outputs the latched signal at the timing of a sampling clock $f_s$. The reciprocal $1/k_x$ of the horizontal magnification is supplied from the latch circuit 52 to one input terminal of an adding device 53. An output signal of the adding device 53 is supplied to a latch circuit 55 and an address generating circuit 56. In addition, the output signal of the adding device 53 is supplied to a latch circuit 54. As with the latch circuit 52, the latch circuit 54 outputs the latched signal at the timing of the clock $f_s$. An output signal of the latch circuit 54 is supplied to another input terminal of the adding device 53. An adding device 53 cumulates the reciprocal $1/k_x$ of the horizontal magnification received from the latch circuit 52 and an output signal of the adding device 53 with a delay of 1fs and outputs a cumulated reciprocal $\Sigma (1/k_x)$.

The cumulated reciprocal $\Sigma (1/k_x)$ is supplied to the address generating circuit 56 and the latch circuit 55. The address generating circuit 56 extracts an integer part from the received cumulated reciprocal $\Sigma (1/k_x)$. On the other hand, the latch circuit 55 extracts a decimal part as the interpolation coefficient p from the received cumulated reciprocal $\Sigma (1/k_x)$. The interpolation coefficient p is directly supplied from the interpolation coefficient generator 50. In addition, the interpolation coefficient p is supplied to an inverting circuit 57 that outputs a 1's complement of the received value. Thus, the inverting circuit 57 outputs a 1's complement (1−p) of the interpolation coefficient p.

On the other hand, the vertical interpolation coefficient generating circuit performs the same process for the reciprocal $1/k_y$ of the vertical magnification received from the dividing device 51 as the process for the reciprocal $1/k_x$ of the horizontal magnification. In other words, the reciprocal $1/k_y$ of the vertical magnification is supplied to a latch circuit 58 that outputs a latched signal at the timing of a horizontal frequency clock $f_h$. The reciprocal $1/k_y$ of the vertical magnification received from the latch circuit 58 at the timing of the clock $f_h$ is supplied to one input terminal of an adding device 59. An output signal of the adding device 59 is supplied to a latch circuit 60 and an address generating circuit 56. In addition, the output signal of the adding device 59 is supplied to a latch circuit 61 that outputs a latched signal at the timing of the clock $f_h$. An output signal of the latch circuit 61 is supplied to another input terminal of the adding device 59. Thus, the adding devices cumulates the reciprocal $1k_y$ of the vertical magnification and outputs a cumulated reciprocal $\Sigma (1/k_y)$.

The cumulated reciprocal $\Sigma (1/k_y)$ is supplied to an address generating circuit 56 and a latch circuit 60. The address generating circuit 56 extracts an integer part from the received cumulated reciprocal $\Sigma (1/k_y)$. On the other hand, the latch circuit 60 extracts a decimal part as the interpolation coefficient q from the received cumulated reciprocal $\Sigma (1/k_y)$ of the vertical magnification. The interpolation coefficient q is directly outputted from the interpolation coefficient generator 50. In addition, the interpolation coefficient q is supplied to an inverting circuit 62 that outputs a 1's complement of the received value. Thus, the inverting circuit 62 outputs a 1−s complement (1−q) of the interpolation coefficient q.

The address generating circuit 56 generates addresses for which coordinates of two points of an original picture are read from the field memories 4a and 4b and thereby a gradation value of a pixel of a converted picture is obtained corresponding to the values of the integer parts of the received cumulated reciprocal $\Sigma (1/k_x)$ and the received cumulated reciprocal $\Sigma (1/k_y)$ In other words, in this example of which $k=k_x=k_y$, the position of the point a of the original picture corresponding to any pixel A of the converted picture is obtained corresponding to the designated magnification k in the predetermined method. Corresponding to the position of the point a, coordinates $a_{00}$ and $a_{10}$ of two adjacent pixels of the point a on the same line are obtained. The address generating circuit 56 generates addresses for which gradation values (pixel data) of pixels corresponding to these coordinates $a_{00}$ and $a_{10}$ are read from the field memories 4a and 4b. The generated addresses are supplied to the memories 4a and 4b.

Gradation values of pixels corresponding to the coordinates $a_{00}$ and $a_{10}$ are read from the field memories 4a and 4b, respectively. The resultant gradation values are supplied to a switch circuit 5. The switch circuit 5 is switched depending on whether the original picture is enlarged or reduced. When the original picture is reduced with the magnification k=0.8, the switch circuit 5 causes the gradation values read from the memories 4a and 4b to be supplied to a horizontally interpolating circuit 7 of a picture reducing portion 6. The horizontally interpolating circuit 7 performs the interpolating process for each pixel on each horizontal line. The resultant gradation value is supplied to a vertically interpolating circuit 8. The vertically interpolating circuit 8 performs the interpolating process for pixels corresponding to each line. Next, the interpolating processes of the horizontally interpolating circuit 7 and the vertically interpolating circuit 8 will be described.

Figure 3:
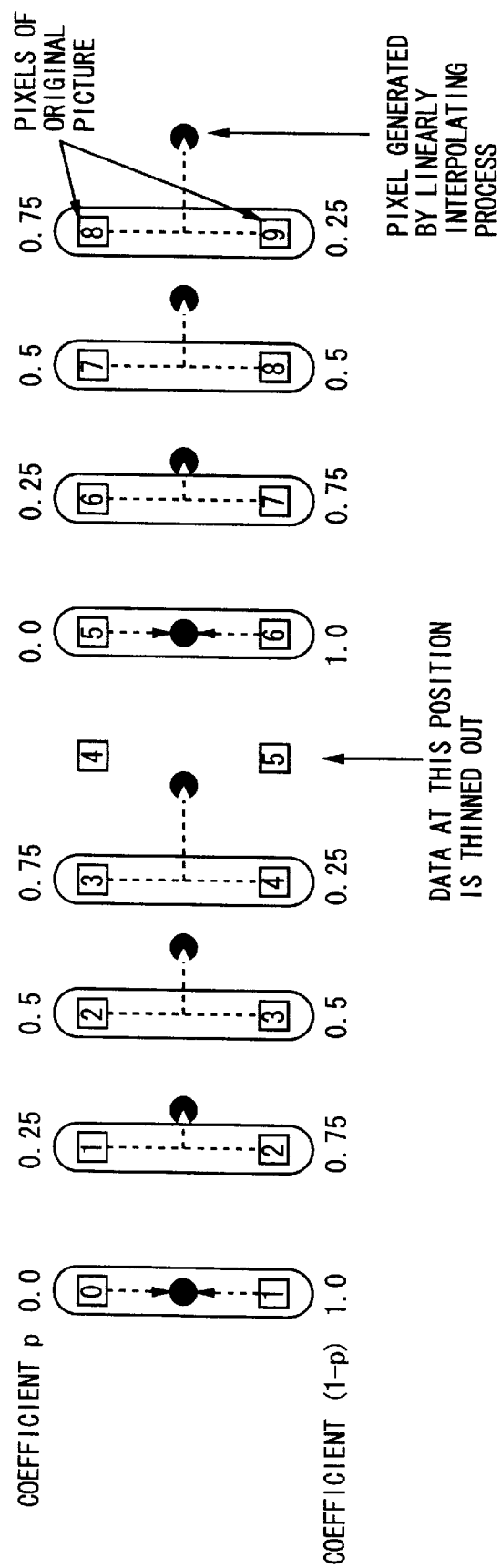
FIG. 3 is a schematic diagram showing a process for obtaining a gradation value a of a point a of an original picture corresponding to a point A of a converted picture.

FIG. 3 shows a process for obtaining a gradation value a of a point a of an original picture in the case that a point A of a converted picture is mapped to the point a of the original picture with gradation values of two adjacent points of the original picture corresponding to an interpolation coefficient p. The horizontally interpolating circuit 7 is composed of for example an adding device, a multiplying device, a 1-sample delaying device, and so forth. The horizontally interpolating circuit 7 performs a calculation of a bracketed term with respect to the coefficient p of the formula (3) (for example, "$(1-p) \cdot a_{00} + p \cdot a_{10}$") for each pixel of pixel data of two points received from the field memories 4a and 4b with the interpolation coefficient p and the 1's complement (1-p) received from the interpolation coefficient generator 50 so as to perform a linearly interpolating process in the horizontal direction. In this case, since the term "$(1-p) \cdot a_{00} + p \cdot a_{10}$" has two multiplication terms, two multiplying devices are required.

As shown in FIG. 3, in this process, when p=1 (namely, 1-p=0), the term of the pixel $a_{10}$ becomes 0. Thus, a pixel at the position of which p=1 is substantially thinned out. The interpolation coefficients in the horizontal direction, p and (1-p), are calculated for each pixel. However, at a position of which a pixel is thinned out, it is not necessary to calculate these interpolation coefficients. The timing of which a pixel is thinned out just depends on the magnification k of the picture reducing process. Thus, when a pixel is thinned out, the coefficient calculating process is not performed. Thus, the load of the calculating process is reduced. The calculated result of the horizontally interpolating circuit 7 is supplied to the vertically interpolating circuit 8.

The vertically interpolating circuit 8 is composed of for example an adding device, a multiplying device, and a line memory. The line memory stores data for one horizontal line. The calculated result supplied to the vertically interpolating circuit 8 is successively written to the line memory. An interpolation coefficient q and a 1's complement (1-q) thereof are supplied from the interpolation coefficient generator 50 to the vertically interpolating circuit 8. The vertically interpolating circuit 8 performs the calculation of the formula (3) for the calculated result received from the horizontally interpolating circuit 7 and the calculated result with a delay of one horizontal period read from the line memory with the interpolation coefficients q and (1-q) and obtains the gradation value a. As with the process of the above-described horizontally interpolating circuit 7, the vertically interpolating circuit 8 thins out a pixel at the timing of q=1.

The gradation value a of which pixels have been thinned out is successively written to the field memory 9. The gradation value a is read from the field memory 9 at a predetermined timing. The gradation value a is supplied to an output terminal 11 through a switch circuit 10 that is switched corresponding to the switch position of the switch circuit 5.

The picture enlarging process of the original picture is performed in the same manner as the picture reducing process thereof. The original picture data received from the input terminal is written to the field memories 4a and 4b through the low pass filters 2 and 3. Picture data is read from the memories 4a and 4b and supplied to a picture enlarging portion 12 corresponding to the switch position of the switch circuit 5. A horizontally interpolating circuit 13 and a vertically interpolating circuit in the picture enlarging portion 12 perform the calculation for the formula (3) with the coefficients p, (1-p), q, and (1-q) received from the interpolation coefficient generator 50 and thereby performs a linearly interpolating process in the horizontal direction and a linearly interpolating process in the vertical direction. Since the horizontally interpolating circuit 13 has calculated the bracketed term with respect to p, the vertically interpolating circuit 14 only performs two multiplications.

The interpolated picture data is supplied to the output terminal 11 through the switch circuit 10. When the original picture is enlarged, since pixels are not thinned out, unlike with the picture reducing process, it is not necessary to dispose a field memory downstream of the vertically interpolating circuit.

Figure 4:
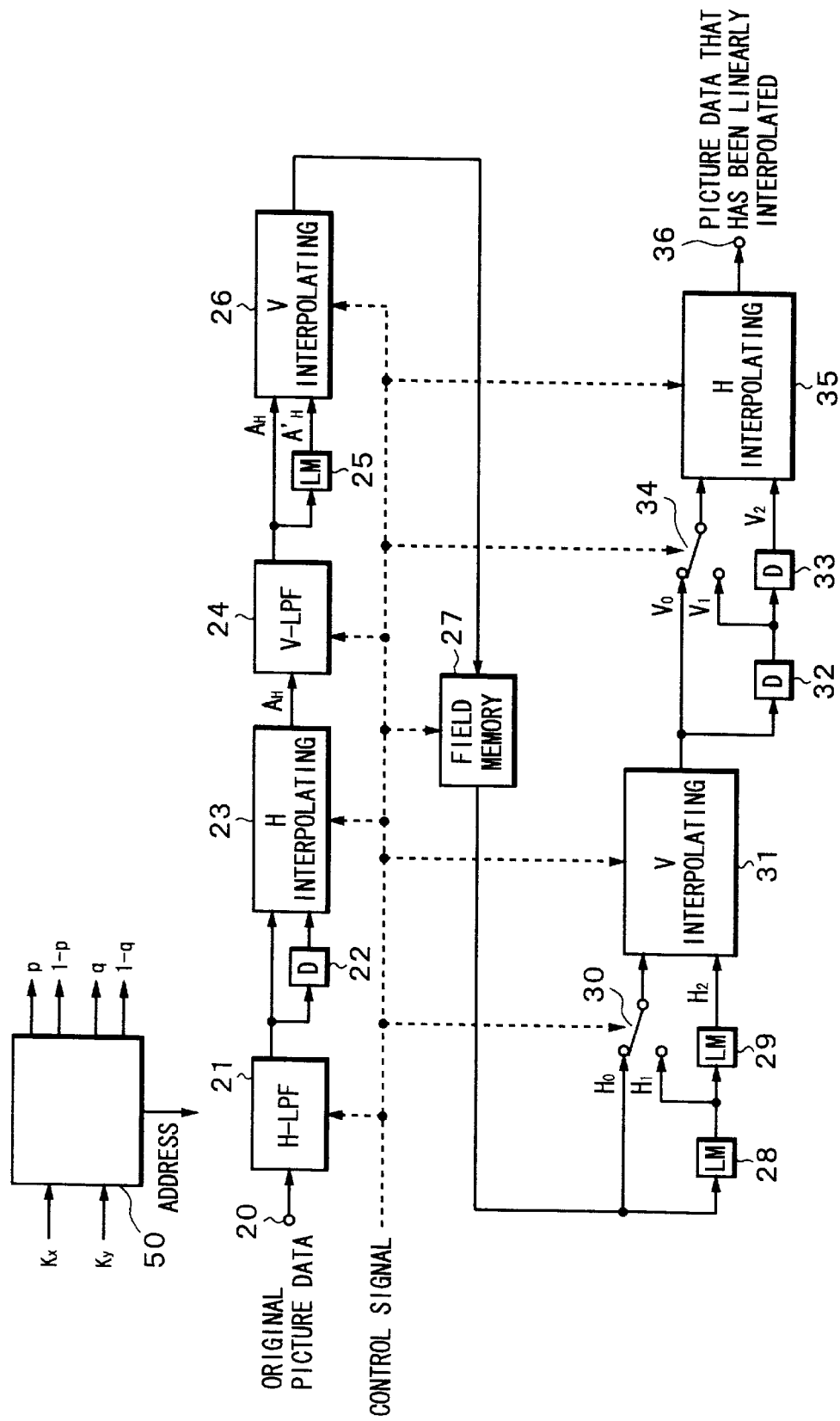
FIG. 4 is a block diagram showing an example of the structure of a picture processing apparatus according to a second embodiment of the present invention.

Next, a second embodiment of the present invention will be described. In the first embodiment, two field memories for the horizontally/vertically interpolating processes and a field memory for the picture reducing process for thinning out pixels are required (thus, a total of three field memories are required). However, when the structure of the first embodiment is modified, a picture can be enlarged/reduced with only one field memory. FIG. 4 shows an example of the structure of a picture processing apparatus according to the second embodiment of the present invention. In the picture processing apparatus according to the second embodiment, a picture is enlarged/reduced with only one field memory.

A control signal is supplied from a CPU (not shown) to circuits composing the picture processing apparatus shown in FIG. 4. These circuits are controlled corresponding to the control signal. Interpolation coefficients p and q and 1's complements (1-p) and (1-q) thereof are generated in the same manner as the first embodiment.

In the picture processing apparatus, when an original picture is reduced, a field memory 27 and circuits upstream thereof are used. In the picture reducing mode, the picture processing apparatus is controlled with the control signal so that signals pass through the circuits downstream of the field memory 27. On the other hand, when an original picture is enlarged, the field memory 27 and circuits downstream thereof are used. In the picture enlarging mode, the picture processing apparatus is controlled with the control signal so that signals pass through the circuits upstream of the field memory 27.

First, the picture reducing process of the original picture will be described. Original picture data is supplied from a terminal 20 to a low pass filter 21. The low pass filter 21 performs a low pass process for the original picture data in the horizontal direction. The resultant original picture data is supplied to one input terminal of a horizontally interpolating circuit 23. In addition, the resultant original picture data is supplied to another input terminal of the horizontally interpolating circuit 23 through a 1-sample delaying device that delays the received signal by one sample clock pulse. The 1-sample delaying device 22 is composed of for example a D type flip-flop. Thus, data of horizontally adjacent pixels is successively supplied to the two input terminals of the horizontally interpolating circuit 23.

The interpolation coefficient generator 50 supplies the interpolation coefficient p and the 1's complement (1-p) thereof to the horizontally interpolating circuit 23. The horizontally interpolating circuit 23 performs a bracketed term of the formula (3) (for example, "$(1-p) \cdot a_{00} + p \cdot a_{10}$") with the gradation values of the pixels $a_{00}$ and $a_{10}$ and the interpolation coefficient p and the 1's complement (1-p) thereof received from to the input terminals and performs a linearly interpolating process in the horizontal direction. As with the first embodiment, when p=1 (namely, 1-p=0), a pixel is thinned out. In this case, for example, the picture processing apparatus may cause the interpolation coefficient generator 50 to skip its process (namely, the interpolation coefficient generator 50 not to calculate the interpolation coefficients).

A calculated result $A_H$ of the horizontally interpolating circuit 23 is supplied to a low pass filter 24. The low pass filter 24 performs a low pass process in the vertical direction for the calculated result $A_H$. The resultant data is directly supplied to one input terminal of a vertically interpolating circuit 26. In addition, the resultant data is written to a line memory 25 that stores data for one line. Data $A_H'$ is successively read from the line memory 25 and supplied to another input terminal of the vertically interpolating circuit 26. In other words, data $A_H$ and $A_H'$ corresponding to vertically adjacent pixels of a converted picture are successively supplied to the terminals of the vertically interpolating circuit 26.

The interpolation coefficient q and the 1's complement (1−q) thereof received from the interpolation coefficient generator 50 are supplied to the vertically interpolating circuit 26. The vertically interpolating circuit 26 performs a calculation for the formula (3) with the pixel data received from the input terminals thereof, the interpolation coefficient q, and the 1's complement (1−q) thereof. Since the data $A_H$ and $A_H'$ received from the input terminals are calculated results of bracketed terms of the formula (3) performed by the horizontally interpolating circuit 23, with a calculation of "$A_H' \times (1-q) + A_H \times q$," the vertically interpolating circuit 26 performs a linearly interpolating process in the vertical direction and obtains the gradation value A at the point A of the converted picture.

As with the horizontally interpolating circuit 23, when q=1 (namely, 1−q=0), the vertically interpolating circuit 26 thins out a pixel. At this point, the picture processing apparatus may cause the interpolation coefficient generators 50 not to generate the interpolation coefficients. The obtained gradation value at the point A of the converted picture is successively written to the field memory 27. As described above, the horizontally interpolating circuit 23 and the vertically interpolating circuit 26 thin out pixels of the gradation value written to the memory 27 in the horizontal direction and the vertical direction, respectively.

The gradation value (namely, pixel data) of the converted picture written to the field memory 27 is read therefrom corresponding to an address controlling process with the control signal. As described above, when a picture is reduced, the picture processing apparatus is controlled with the control signal so that signals pass through the circuits downstream of the field memory 27. Thus, the pixel data that has been interpolated and thinned out is directly supplied from the memory 27 to an output terminal 36.

Next, the picture enlarging process of an original picture will be described. As described above, when the original picture is enlarged, the picture processing apparatus is controlled with the control signal so that signals pass through the circuits upstream of the field memory 27. Thus, the original picture data received from the input terminal 20 is directly written to the field memory 27.

Figure 5:
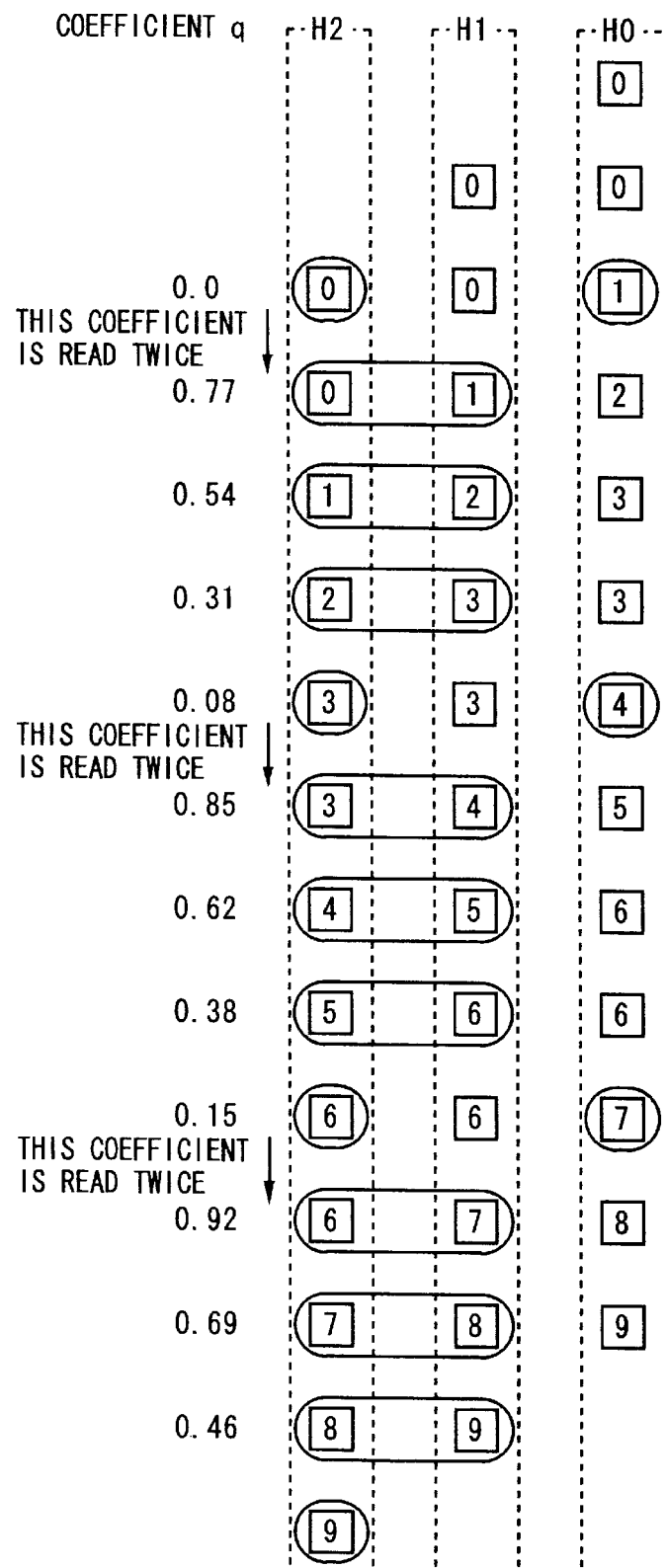
FIG. 5 is a schematic diagram showing a process for enlarging a picture.

The original picture data written to the memory 27 is read by an address controlling process with the control signal. The original picture data is successively read twice corresponding to the enlargement magnification k (in this example, $k_x = k_y = 1.3$). In the picture enlarging process, when the interpolating process in the vertical direction is performed, data of two adjacent lines is required for a plurality of interpolating calculations at the same time. FIG. 5 shows a picture enlarging process. In FIG. 5, the vertical axis represents time axis of which time elapses in the downward direction. When the interpolating process in the vertical direction is performed under the condition of $k \leq 2$, data of two adjacent lines is required. However, since data of the same two lines is used in a plurality of interpolating calculations, in this example, as shown in FIG. 4, two line memories 28 and 29 are provided.

Pixel data of the original picture is successively read from the field memory 27 corresponding to addresses generated by the interpolation coefficient generating circuit 50. Thus, the interpolation coefficient generator 50 supplies the interpolation coefficient q and the 1's complement (1−q) thereof to a vertically interpolating circuit 31 that will be described later. In addition, the interpolation coefficient generator 50 supplies the interpolation coefficient p and the 1's complement (1−p) thereof to a horizontally interpolating circuit 35 that will be described later.

As described above, pixel data is read from the field memory 27 corresponding to read addresses generated corresponding to the value of the integer part of n/k that is a cumulated value of 1/k. Assuming that k=1.3 and that the first read line is line 0, as denoted by Ho in FIG. 5, lines 0, 3, 6, and so forth are read twice corresponding to the values of the integer part of the calculated results 0/k=0, 1/k=0.77, 2/k=1.54, 3/k=2.31, 4/k=3.08, 5/k=3.85, 6/k=4.62, 7/k=5.38, 8/k=6.15, 9/k=6.92, 10/k=7.69, and so forth. At this point, pixel data of each line is also read twice.

The pixel data that is read from the field memory 27 is supplied to one input terminal of a switch circuit 30 that is controlled corresponding to the control signal. This pixel data is denoted by $H_0$ in FIG. 5. In addition, the pixel data that is read from the field memory 27 is also supplied to the line memory 28. The line memory 28 delays the received pixel data for one line. The delayed pixel data is denoted by Hi in FIG. 5. The pixel data $H_1$ is supplied to another input terminal of the switch circuit 30. In addition, the pixel data that is read from the line memory 28 is supplied to the line memory 29. The line memory 29 delays the received pixel data for one line. The output pixel data of the line memory 29 is denoted by $H_2$ in FIG. 5. The pixel data $H_2$ is supplied to another input terminal of the vertically interpolating circuit 31.

As shown in FIG. 5, under the control of the switch circuit 30 with the control signal, the pixel data $H_2$ that is read from the line memory 29 is combined with two vertically adjacent pixels selected from the pixel data $H_0$ and $H_1$. When pixels are successively read twice, pixels $H_0$ and $H_2$ are combined. When pixels were successively read twice, pixels $H_1$ and $H_2$ are combined. The vertically interpolating circuit 31 performs an interpolating process with the pixel data $H_2$ and pixel data selected from the pixel data $H_0$ and pixel data $H_1$. The vertically interpolating circuit 31 performs the interpolating process with the two types of pixel data, the interpolation coefficient q, and the 1's complement (1−q) thereof corresponding to the formula (2).

Pixel data $V_0$ that is output from the vertically interpolating circuit 31 is supplied to one input terminal of the switch circuit 34 that is controlled corresponding to the control signal. In addition, the pixel data $V_0$ is also supplied to a 1-sample delaying device 32. The 1-sample delaying device 32 delays the pixel data $V_0$ for one pixel and supplies the delayed pixel data $V_1$ to another input terminal of the switch circuit 34. In addition, the pixel data $V_1$ is also supplied to a 1-sample delaying device 33. The 1-sample delaying device delays the pixel data $V_1$ for one pixel and supplies the resultant pixel data $V_2$ to another input terminal of the horizontally interpolating circuit 35.

The process of the horizontally interpolating circuit 35 is similar to the process of the above-described vertically interpolating circuit 31. In other words, under the control of the switch circuit 34 with the control signal, data that is adjacent to the data $V_2$ supplied from the 1-sample delaying device 33 is selected from the data $V_0$ and the data $V_1$ that are supplied to the input terminals of the switch circuit 34.

The selected data $V_0$ or $V_1$ and the data $V_2$ are supplied to the horizontally interpolating circuit 35. The horizontally interpolating circuit 35 calculates "$(1-p) \times V_2 + p \times V_{0\ OR\ 1}$" with these two types of data and the interpolation coefficient p and the 1's coefficient (1–p) thereof received corresponding to the control signal. Thus, the horizontally interpolating circuit 35 performs the calculation for the above-described formula (2) and thereby performs the linearly interpolating processes in the vertical direction and the horizontal direction. Thus, the gradation value A of the point A of the converted picture is obtained. The obtained gradation value A is successively supplied to an output terminal 36.

In the second embodiment, although enlargement magnification $k \leq 2$, when the number of line memories disposed upstream of the vertically interpolating circuit 31 is m and the number of 1-sample delaying devices disposed upstream of the horizontally interpolating circuit 35 is m, the enlargement magnification k can be increased to m.

Next, a third embodiment of the present invention will be described. FIG. 6 shows an example of the structure of a picture processing apparatus according to the third embodiment. In the third embodiment, a linearly interpolating process is performed with enlargement magnification k>1. The third embodiment can be applied for a structure including the field memory 27 for the enlarging process according to the second embodiment. In the structure according to the third embodiment, one line memory and one 1-sample delaying device are disposed. Circuits that compose the apparatus according to the third embodiment are controlled with a control signal generated and supplied by a CPU (not shown). An interpolation coefficient generator 50 generates an interpolation coefficient p, a 1's complement (1–p) thereof, an interpolation coefficient q, and a 1's complement (1–q) thereof in the same manner as those of the first and second embodiments.

Figure 7A:
FIGS. 7A to 7D are schematic diagrams showing an example of a memory controlling process according to the third embodiment of the present invention.
Figure 7B:
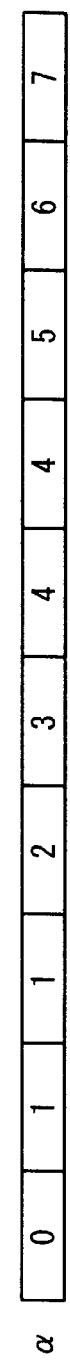

Original picture data is received from an input terminal 40. The original picture data is written to a field memory 41. Pixel data is read for each line from the field memory 41 corresponding to a signal read IP supplied as the control signal. FIG. 7A shows an example of the signal read IP. FIG. 7B shows an example of a line that is read corresponding to the signal read IP. When the signal level of the signal read IP is "H," a read address for which a line is read from the field memory 41 increases. In contrast, when the signal level of the signal read IP is "L," the read address remains unchanged.

Figure 7C:
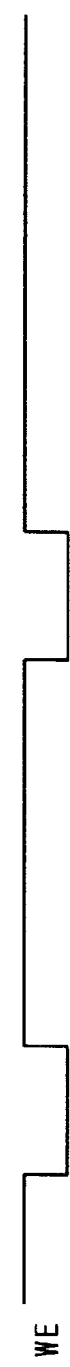
Figure 7D:
Figure 8:
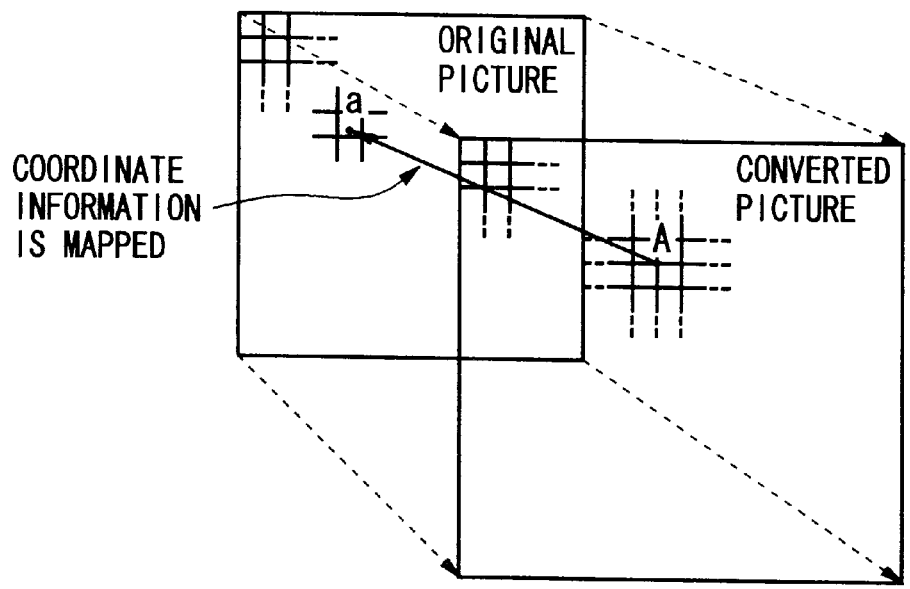
FIG. 8 is a schematic diagram for explaining a process for enlarging an original picture with any magnification k and thereby forming a converted picture.
Figure 9:
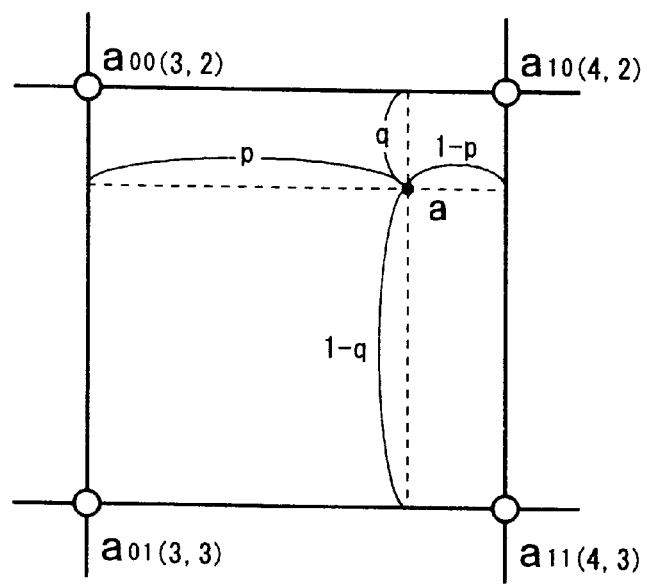
FIG. 9 is a schematic diagram for explaining a process for mapping a pixel of a converted picture to an original picture.
Figure 10:
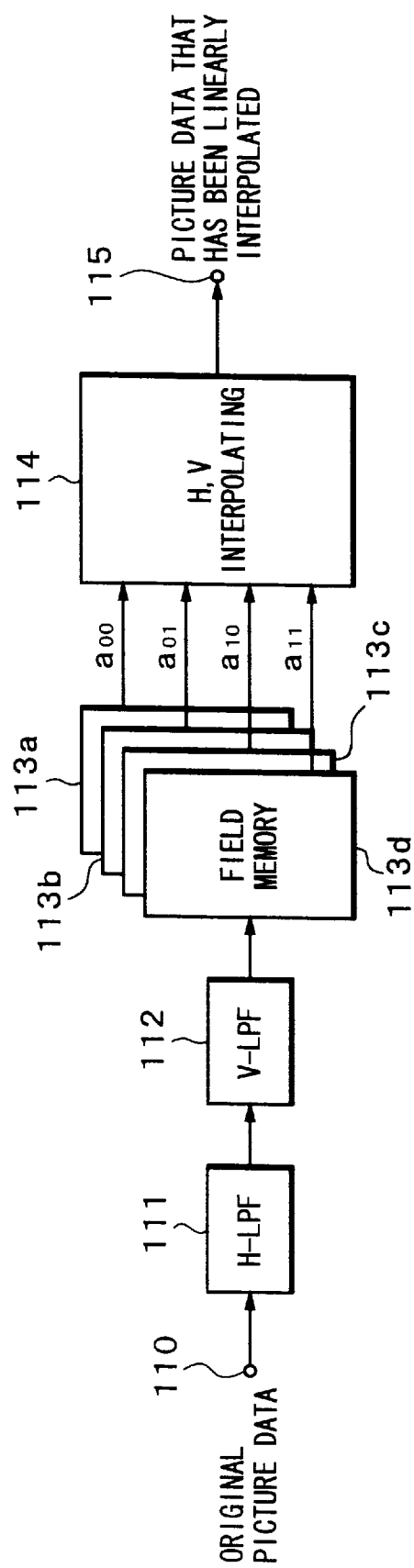
FIG. 10 is a block diagram showing an example of the structure of a picture processing apparatus according to a prior art reference.

Pixel data that is read for each line from the field memory 41 is supplied to one input terminal of a vertically interpolating circuit 43 with a path α shown in FIG. 6. In addition, the pixel data is also supplied to a line memory 42. Data is written to the line memory 42 corresponding to a signal WE supplied as the control signal. FIG. 7C shows an example of the signal WE. FIG. 7D shows an example of lines that are written corresponding to the signal WE. When the signal level of the signal WE is "H," data is written to the line memory 42. When the signal level of the signal WE is "L," data is not written to the line memory 42. In other words, data that has been written is maintained. The data that has been read from the line memory 42 is supplied to another input terminal of the vertically interpolating circuit 43 with a path β shown in FIG. 6.

FIGS. 7B and 7D show that data that is read with the path a is a combination of the pixel data $H_0$ and the pixel data $H_1$ of the second embodiment. In contrast, the data that is read with the path β is equivalent to the pixel data H2 of the second embodiment. Thus, as with the vertically interpolating circuit 31 according to the second embodiment, the vertically interpolating circuit 43 performs the linearly interpolating process in the vertical direction corresponding to the formula (2) with the pixel data that is read with the paths α and β and the interpolation coefficient q and the 1's complement (1–q) thereof supplied corresponding to the control signal.

The data that has been linearly interpolated in the vertical direction is controlled corresponding to a signal equivalent to the above-described signal read IP. Output data of the vertically interpolating circuit 43 is supplied to one input terminal of a horizontally interpolating circuit 45. In addition, the output data of the vertically interpolating circuit 43 is also supplied to a 1-sample delaying device 44. Data that is read from the 1-sample delaying device 44 is supplied to another input terminal of the horizontally interpolating circuit 45. Data that is read from the 1-sample delaying device 44 is controlled with a signal equivalent to the above-described signal WE. The horizontally interpolating circuit 45 performs a linearly interpolating process in the horizontal direction corresponding to the formula (2) with the data supplied to the input terminals and the interpolation coefficient p and the 1's complement (1–p) thereof supplied corresponding to the control signal. Pixel data that has been linearly interpolated in the vertical and horizontal directions is supplied to an output terminal 46.

In the first, second, and third embodiments, data is linearly interpolated in the horizontal and vertical directions. However, the present invention is not limited to such interpolating processes. Instead, data can be non-linearly interpolated.

Moreover, in the picture reducing process and picture enlarging process according to the first, second, and third embodiments, the order of the interpolating process in the horizontal direction and the interpolating process in the vertical direction is not limited as those in the first, second, and third embodiments. In other words, the order of the interpolating process in the horizontal direction and the interpolating process in the vertical direction can be reversed.

As described above, according to the present invention, when a linearly interpolating process is performed and a picture is enlarged/reduced, the number of field memories is reduced. In other words, in the first embodiment, the number of field memories required is reduced from four to three. In the second and third embodiments, the number of field memories required is reduced from four to one.

Since the number of field memories that account for a major part of the cost of the linearly interpolating circuits is reduced, the cost of the final product can be reduced.

In addition, according to the present invention, since the linearly interpolating process in the horizontal direction and the linearly interpolating process in the vertical direction are separately performed, the number of multiplying devices can be reduced from eight to four.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A picture processing apparatus for linearly interpolating a picture composed of pixels obtained from digital pixel data so as to enlarge/reduce the picture with any selected ratio, comprising:

a field memory to or from which pixel data is written or read; and at least one of picture reduction interpolating means disposed upstream of said field memory and picture enlargement interpolating means disposed downstream of said field memory, wherein said picture reduction interpolating means includes:

first horizontal interpolating means for performing an interpolating process in a horizontal direction for two horizontally adjacent pixels; and first vertical interpolating means for performing an interpolating process in a vertical direction for two vertically adjacent pixels, said first vertical interpolating means being connected to said first horizontal interpolating means, and wherein said picture enlargement interpolating means includes:

second vertical interpolating means for performing an interpolating process in the vertical direction for two adjacent pixels selected from a plurality of vertically successive pixels; and second horizontal interpolating means for performing an interpolating processing in the horizontal direction for two adjacent pixels selected from a plurality of horizontally successive pixels, said second horizontal interpolating means being connected to said second vertical interpolating means in series, wherein each of interpolation coefficients used for the interpolating process in the horizontal direction and the vertical direction is based on a value of a decimal part of a result of a cumulated sum of a reciprocal of enlargement/reduction magnification in the horizontal direction and the vertical direction, respectively.

2. A picture processing apparatus for enlarging/reducing a picture composed of pixels obtained from digital pixel data with any selected ratio, comprising:

a field memory to which pixel data is written for each field of the picture;

horizontal interpolating means for performing an interpolating process in a horizontal direction for the pixel data; and vertical interpolating means for performing an interpolating process in a vertical direction for the pixel data, wherein the interpolating process in the horizontal direction and the interpolating process in the vertical direction are successively performed, and wherein each of interpolating coefficients used for the interpolating processes in the horizontal direction and the vertical direction is based on a value of a decimal part of a result of a cumulated sum of a reciprocal of enlargement/reduction magnification in the horizontal direction and the vertical direction, respectively.

3. The picture processing apparatus as set forth in claim 2, wherein when the picture is reduced, a pixel at a position of which the value of the decimal part becomes 0 is thinned out and the interpolation coefficients are not calculated at said position.

4. The picture processing apparatus as set forth in claim 2, wherein when the picture is enlarged, pixel data is read from said field memory corresponding to the value of an integer part of the result of the cumulated sum.

5. The picture processing apparatus as set forth in claim 2, wherein each of the interpolating processes are linear interpolating processes.

6. A picture processing apparatus for linearly interpolating a picture composed of pixels obtained from digital pixel data so as to enlarge/reduce the picture with any selected ratio, comprising:

a field memory to or from which pixel data is written or read; and at least one of picture reduction interpolating means disposed upstream of said field memory and picture enlargement interpolating means disposed downstream of said field memory, wherein said picture reduction interpolating means includes:

first horizontal interpolating means for performing an interpolating process in a horizontal direction for two horizontally adjacent pixels; and first vertical interpolating means for performing an interpolating process in a vertical direction for two vertically adjacent pixels, said first vertical interpolating means being connected to said first horizontal interpolating means, and wherein said picture enlargement interpolating means includes:

second vertical interpolating means for performing an interpolating processing the vertical direction for two adjacent pixels selected from a plurality of vertically successive pixels; and second horizontal interpolating means for performing an interpolating process in the horizontal direction for two adjacent pixels selected from a plurality of horizontally successive pixels, said second horizontal interpolating means being connected to said second vertical interpolating means in series, wherein said picture enlargement interpolating means selects the two adjacent pixels in each of the horizontal direction and the vertical direction with a first signal and a second signal, the first signal causing pixel data to be read from said field memory corresponding to the value of an integer part of the result of the cumulated sum, the second signal causing pixel data to be written to delaying means for obtaining a plurality of successive pixels corresponding to the value of the integer part.

7. A picture processing method for enlarging/reducing a picture composed of pixels obtained from digital pixel data with any selected ratio, comprising the steps of:

(a) writing pixel data for each field;

(b) performing an interpolating process in a horizontal direction for the pixel data, (c) performing an interpolating process in a vertical direction for the pixel data, wherein the interpolating process in the horizontal direction and the interpolating process in the vertical direction are successively performed, and wherein each interpolation coefficient used for the interpolating processes in the horizontal direction and the vertical direction is based on a value of a decimal part of a result of a cumulated sum of a reciprocal of enlargement/reduction magnification in the horizontal direction and the vertical direction, respectively.

8. The picture processing method as set forth in claim 7, wherein when the picture is reduced, a pixel at a position at which the value of the decimal part becomes 0 is thinned out and the interpolation coefficients are not calculated at said position.

9. The picture processing method as set forth in claim 7, wherein when the picture is enlarged, pixel data is read from said field memory corresponding to the value of an integer part of the result of the cumulated sum.

10. The picture processing method as set forth in claim 9, wherein each of the interpolating processes are linear interpolating processes.

11. The picture processing apparatus as set forth in claim 1, wherein when the picture is reduced, a pixel at a position of which the value of the decimal part becomes 0 is thinned out and the interpolation coefficients are not calculated at said position.

12. The picture processing apparatus as set forth in claim 1, wherein when the picture is enlarged, pixel data is read from said field memory corresponding to the value of an integer part as a result of the cumulated sum.

* * * * *